United States Patent
Sievers et al.

(10) Patent No.: US 8,855,620 B2
(45) Date of Patent: Oct. 7, 2014

(54) SYSTEMS AND METHODS FOR APPLICATION PROGRAM AND APPLICATION PROGRAM UPDATE DEPLOYMENT TO A MOBILE DEVICE

(75) Inventors: Andrew M. Sievers, Sausalito, CA (US); Rodney Aiglstorfer, Sausalito, CA (US)

(73) Assignee: MFoundry, Inc., Sausalito, CA (US)

( * ) Notice: Subject to any disclaimer, the term of this patent is extended or adjusted under 35 U.S.C. 154(b) by 1309 days.

(21) Appl. No.: 11/366,832

(22) Filed: Mar. 1, 2006

(65) Prior Publication Data

US 2008/0003991 A1  Jan. 3, 2008

Related U.S. Application Data

(60) Provisional application No. 60/657,955, filed on Mar. 1, 2005.

(51) Int. Cl.
| | |
|---|---|
| H04M 3/00 | (2006.01) |
| G06F 15/16 | (2006.01) |
| G06F 9/44 | (2006.01) |
| G06F 9/445 | (2006.01) |
| H04L 29/08 | (2006.01) |
| H04M 1/725 | (2006.01) |

(52) U.S. Cl.
CPC  H04L 67/34 (2013.01); G06F 8/65 (2013.01); H04M 1/72525 (2013.01); H04L 67/04 (2013.01)
USPC .......................... 455/419; 709/219; 717/168

(58) Field of Classification Search
USPC .......................... 455/419; 709/219; 717/168
See application file for complete search history.

(56) References Cited

U.S. PATENT DOCUMENTS

| | | | |
|---|---|---|---|
| 2001/0029178 A1 | 10/2001 | Criss et al. | |
| 2003/0060896 A9 * | 3/2003 | Hulai et al. | 700/1 |
| 2003/0100301 A1 | 5/2003 | Fujii | |
| 2003/0236867 A1 * | 12/2003 | Natsuno et al. | 709/220 |
| 2004/0210891 A1 | 10/2004 | Kouznetsov et al. | |
| 2005/0136939 A1 * | 6/2005 | Mountain et al. | 455/453 |

FOREIGN PATENT DOCUMENTS

WO    WO 02075527 A2 *  9/2002

* cited by examiner

*Primary Examiner* — Marisol Figueroa
(74) *Attorney, Agent, or Firm* — Finnegan, Henderson, Farabow, Garrett & Dunner LLP

(57) ABSTRACT

The present invention comprises a system and method for receiving at an application server a request for a software application from a mobile device wherein the request includes an indicator that allows the application server to tell whether the mobile device currently has a software application interpreter installed, sending the software application interpreter to a cellular wireless network for provisioning to the mobile device if the indicator shows that the mobile device does not have the application interpreter installed, and sending the software application to a cellular wireless network for provisioning to the mobile device. The invention further comprises a system and method for updating the software application in a way that seems automatic to a user.

18 Claims, 36 Drawing Sheets

```
<?xml version="1.0" encoding="UTF-8"?>
<mil xmlns:xsi="http://www.w3.org/2001/XMLSchema-instance" xsi:noNamespaceSchemaLocatio
</mil>
```

*FIG. 19*

```
<?xml version="1.0" encoding="UTF-8"?>
<mil xmlns:xsi="http://www.w3.org/2001/XMI
<|
<  alert
<  httpservice
<  model
<  resource
<  screen
   style
   webservice
   /mil>
   !-- -->
   ![CDATA[]]>
```

*FIG. 20*

```
<httpservice id="GetEngadgetNews" ></httpservice>
</mil>
```

```
<?xml version="1.0" encoding="UTF-8"?>
<mil xmlns:xsi="http://www.w3.org/2001/XMLSchema-instance" xsi:noNamespaceSchemaLocation="http://develop
<httpservice id="GetEngadgetNews" hostname="www.engadget.com" path="/rss.xml" resultid="news"></httpserv
```

*FIG. 22*

```
<?xml version="1.0" encoding="UTF-8"?>
<mil xmlns:xsi="http://www.w3.org/2001/XMLSch
<httpservice id="GetEngadgetNews" hostname="w
<
    alert
    httpservice
    model
    resource
    screen
    style
    webservice
    /mil>
    !-- -->
    ![CDATA[]]>
```

*FIG. 23*

```
<?xml version="1.0" encoding=
<mil xmlns:xsi="http://www.w3
<httpservice id="GetEngadgetN
 <screen id=""></screen>
 </mil>
```

*FIG. 24*

```
<screen id="home">
</screen>
</mil>
```

*FIG. 25*

```
<?xml version="1.0" encoding="UTF-8"?>
<mil xmlns:xsi="http://www.w3.org/2001/XMLSch
<httpservice id="GetEngadgetNews" hostname="w
<screen id="home">
<
<   banner
    form
    list
    textarea
    /screen>
    !-- -->
    ![CDATA[]]>
```

*FIG. 26*

```
<?xml version="1.0" encoding="UTF-8"?>
<mil xmlns:xsi="http://www.w3.org/2001/XMLSchema-instance" xsi:noNamespaceSch
<httpservice id="GetEngadgetNews" hostname="www.engadget.com" path="/rss.xml"
<screen id="home">
<list>
<option label="Engadget" service="GetEngadgetNews" target="EngadgetScreen" />
</list>
</screen>
 </mil>
```

*FIG. 28*

```
<?xml version="1.0" encoding="UTF-8"?>
<mil xmlns:xsi="http://www.w3.org/2001/XMLSchema-instance" xsi:noNamespaceSchema
<httpservice id="GetEngadgetNews" hostname="www.engadget.com" path="/rss.xml" re
<screen id="home">
<list>
<option label="Engadget" service="GetEngadgetNews" target="EngadgetScreen" />
<option label="Wall Street Journal"/>
<option label="Ars Technica"/>
</list>
</screen>
<screen id="EngadgetScreen">
<form>
<repeater></repeater>
</form>
</screen>
 </mil>
```

*FIG. 29*

```
<?xml version="1.0" ?>
- <rss version="2.0" xmlns:dc="http://purl.org/dc/elements/1.1/">
- <channel>
    <title>Engadget</title>
    <link>http://www.engadget.com/</link>
    <description />
  - <image>
      <url>http://www.weblogsinc.com/common/media/feedlogo-engadget.gif</url>
      <title>Engadget</title>
      <link>http://www.engadget.com/</link>
    </image>
    <language>en-us</language>
    <copyright>Copyright 2004 Weblogs, Inc. The contents of this feed are available for non-commercial use only.</copyright>
    <generator>Blogsmith 0.5 http://www.blogsmith.com/</generator>
  - <item>
      <title>Apple files suit over the iPod flash?</title>
      <link>http://www.engadget.com/entry/1234000213024133/</link>
      <guid isPermaLink="true">http://www.engadget.com/entry/1234000213024133/</guid>
    - <description>
```

FIG. 30

```
<?xml version="1.0" encoding="UTF-8"?>
<mil xmlns:xsi="http://www.w3.org/2001/XMLSchema-instance" xsi:noNamespaceSchemaLocation="http
<httpservice id="GetEngadgetNews" hostname="www.engadget.com" path="/rss.xml" resultid="news">
<screen id="home">
<list>
<option label="Engadget" service="GetEngadgetNews" target="EngadgetScreen"/>
<option label="Ars Technica"/>
<option label="Wall Street Journal"/>
</list>
</screen>
<screen id="EngadgetScreen">
<form>
<repeater source="{news#/rss/channel/item/title}">
<textitem label="{text()}"/>
</repeater>
</form>
</screen>

</mil>
```

*FIG. 31*

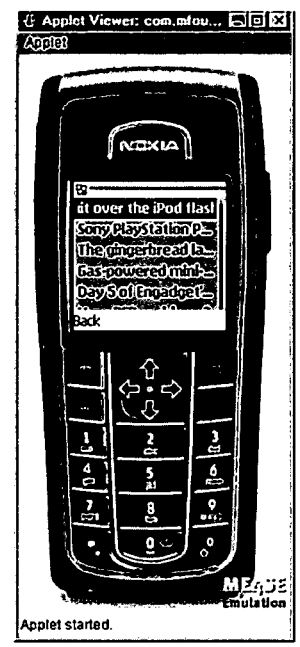
*FIG. 35A*   *FIG. 35B*

 
*FIG. 36A*  *FIG. 36B*

SYSTEMS AND METHODS FOR APPLICATION PROGRAM AND APPLICATION PROGRAM UPDATE DEPLOYMENT TO A MOBILE DEVICE

PRIORITY CLAIM

This application claims priority to provisional application 60/657,955 filed Mar. 1, 2005 which is incorporated herein by reference in its entirety.

BACKGROUND OF THE INVENTION

Previous methods of obtaining mobile software applications did not allow for a transparent, seamless delivery of both an application and the interpreter relevant to a particular mobile device needed to run the application. Previous methods also did not allow for updating of a mobile device software application across a variety of platforms and interpreters where the application but not the interpreters was updated in a method that seemed automatic to the users without need for a direct request or approval.

Therefore there is a need for seamless deployment of a mobile software application interpreter and an application that runs on the mobile application interpreter as well as a need for updating the application in a way that seems automatic to a user.

SUMMARY OF THE INVENTION

The present invention comprises a system and method for receiving at an application server an updated software application from a development environment, identifying the updated software application with a version identifier, receiving a first version identifier for a software application corresponding to the updated software application from a mobile device during a first session via a cellular network, comparing the first version identifier to the updated version identifier, and sending the updated software application to the mobile device according to the comparison.

The present invention further comprises a system and method for receiving at an application server a request for a software application from a mobile device wherein the request includes an indicator that allows the application server to tell whether the mobile device currently has a software application interpreter installed, sending the software application interpreter to a cellular wireless network for provisioning to the mobile device if the indicator shows that the mobile device does not have the application interpreter installed, and sending the software application to a cellular wireless network for provisioning to the mobile device.

As will be readily appreciated from the foregoing summary, the invention provides a system and method for seamless deployment of a mobile software application interpreter and an application that runs on the mobile application interpreter as well as a system and method for updating the application in a way that seems automatic to a user.

BRIEF DESCRIPTION OF THE DRAWINGS

Preferred and alternative embodiments of the present invention are described in detail below with reference to the following drawings.

FIGS. 8-36B illustrate an example of one embodiment of the present invention.

DETAILED DESCRIPTION OF THE PREFERRED EMBODIMENT

Figure 1:
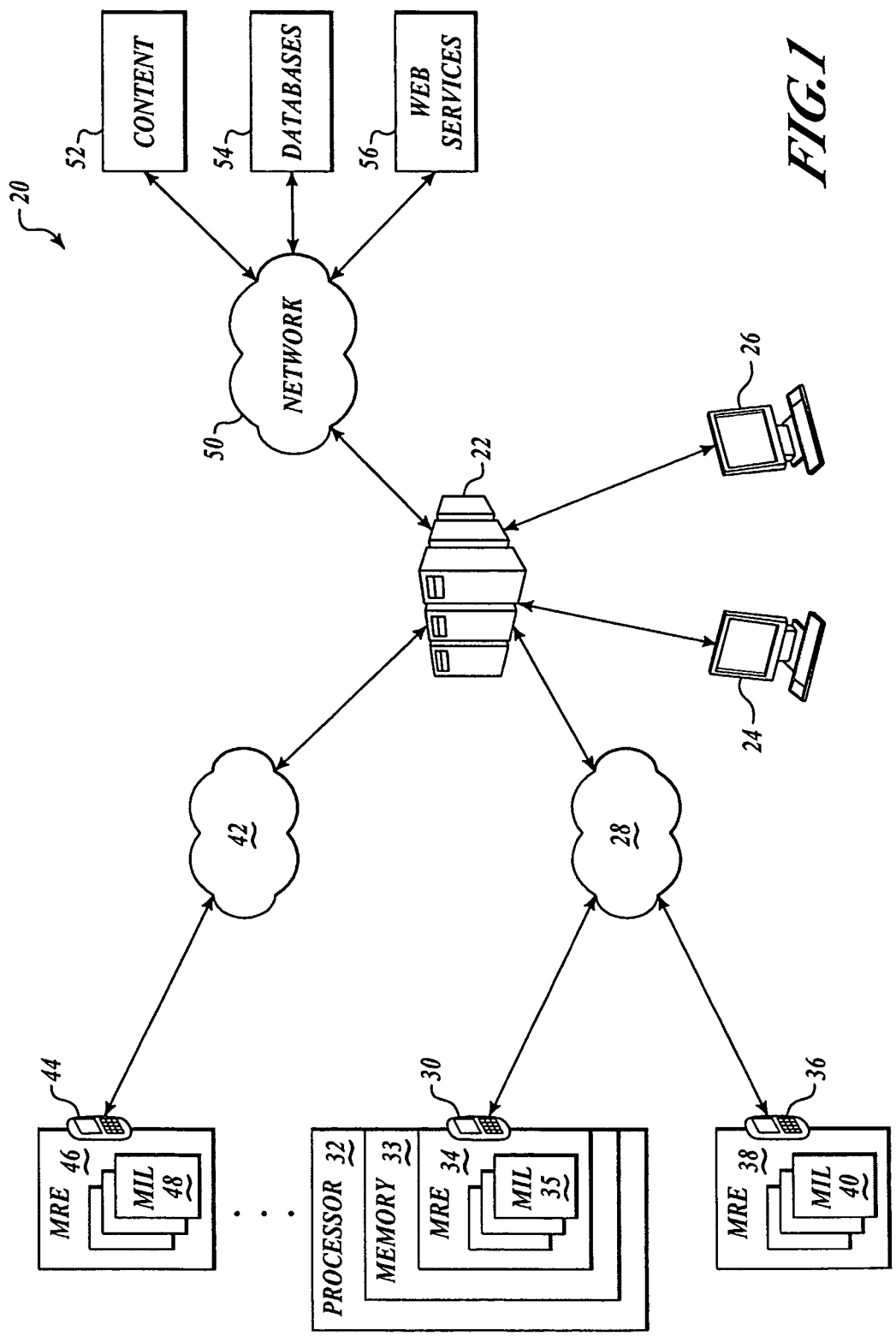
FIG. 1 illustrates a system in accordance with one embodiment of the present invention.

FIG. 1 illustrates a system 20 in accordance with one embodiment of the present invention. The system 20 includes a server farm 22 having one or more servers. The servers include processors, memory, secondary storage, network connections, and computer software programs stored in memory or secondary storage that are necessary for their operation or that may be stored for the use or future deployment to users of the servers. The server farm 22 is used to host mobile software applications and upgrades for deployment to mobile devices 30, 36, 44 over cellular wireless networks 28, 42. The system 20 includes a development environment 24 which may be either directly connected to the server farm 22 or be connected via a network or other means. The development environment 24 is a computer based device(s) that is used to create software applications and upgrades which are then uploaded to the server farm 22 for deployment to mobile devices 30, 36, 44. The system 20 also includes an administrator's console 26, also a computer based device(s), which is either directly connected to the server farm 22 or connected via a network or other means. The administrator's console 26 can be used to identify which software applications are ready for release to various mobile devices 30, 36, 44. The administrator's console 26 can also be used to monitor the usage of applications over the cellular wireless networks 28, 42, and a network 50.

The system 20 also includes a first cellular wireless network 28 over which software applications are provisioned to mobile devices 30, 36, 44. Example mobile devices are illustrated in this diagram as a first mobile device 30 and a second mobile device 36. The mobile devices could typically include phones with data capability and data devices such as network enabled personal digital assistants that communicate over a cellular wireless network but do not have voice capability. The first mobile device 30 includes a processor 32 in data communication with a memory 33. A first Moblet Runtime Environment (MRE) 34 resides in the memory 33 on the mobile device 30 and functions as an interpreter for running software applications which are downloaded from the server farm 22. A first application written in Moblet Instruction Language (MIL) is illustrated as an application 35 shown as residing in the memory 33 of the first mobile device 30. MIL is an extensible markup language (XML) based language that is designed to allow a developer to quickly author a single version of an application that will run on any device that has previously received an MRE. The MRE will be configured for each type of mobile device that may be used on a network. For example in this case, the first mobile device 30 could be a Java 2 Platform, Micro Edition (J2ME) based device with the corresponding first MRE 34.

The second mobile device 36 is also shown as being linked to the first cellular wireless network 28. Although not shown, the second mobile device 36 includes a processor in data communication with a memory similarly to the first mobile device 30. The second mobile device 36 may be based on an operating system other than J2ME, such as Symbian or other known systems or future systems to be developed. The second mobile device 36 also includes a second MRE 38 which would be configured to run on the operating system of the second mobile device 36 or on an additional interpreter running on the base operating system of the mobile device, such as a java interpreter. A second application 40, written in MIL, is also shown as residing within the second mobile device 36. Software applications in MIL do not need to be configured for each phone individually. However, the software applications are interpreted differently by the MRE residing on a given phone so the application is translated correctly for the operating system of the phone. However, as stated above, the applications written in MIL themselves would not need to be customized for each type of mobile device.

To illustrate that the server farm 22 is able to communicate over a variety of wireless cellular networks and mobile devices, a second cellular wireless network 42 is shown along with a third mobile device 44 communicating over the second cellular wireless network 42 with the server farm 22. Although not shown, the third mobile device 44 includes a processor in data communication with a memory similarly to the first mobile device 30. The third mobile device 44 could be based on a different operating system than both the first mobile device 30 and the second mobile device 36. This would require a third MRE 46 to be present on the third mobile device 44 in order to run software applications written in MIL. A third application 48 written in MIL is also shown residing on the third mobile device 44. In all situations, additional mobile devices could be present in data communication with the server farm 22 over various cellular wireless networks.

In addition to deploying mobile software applications to mobile devices, the server farm 22 also allows the mobile software applications to communicate with various data sources over a public or private network, such as the Internet. A network 50 is shown connecting the server farm 22 to a content provider 52, a database 54, and a web services provider 56. Access to the content provider 52, the database 54, or the web services provider 56 would depend upon the particular mobile software application in use on a particular mobile device. The content provider 52 could provide requested content from a software application such as news or stock quotes, sports scores, or any other type of requested information. The content 52 could also include advertising content which is either requested or alternatively pushed to groups of particular mobile devices over a public or private network such as the Internet via the server farm 22 based on either the type of software application present on the mobile devices or, in other situations, by demographic criteria associated with the user of a particular mobile device. The database 54 could also be one of a variety of databases. For example, an application could search for available wireless access locations shown by example in FIGS. 5A to 7B and FIG. 10 below, or an additional application could select for reviews of movies or wines based on specific criteria that are stored in the database 54. The web services provider 56 could also be providing a variety of services. These services could include various types of public or private network sales and services.

Figure 2:
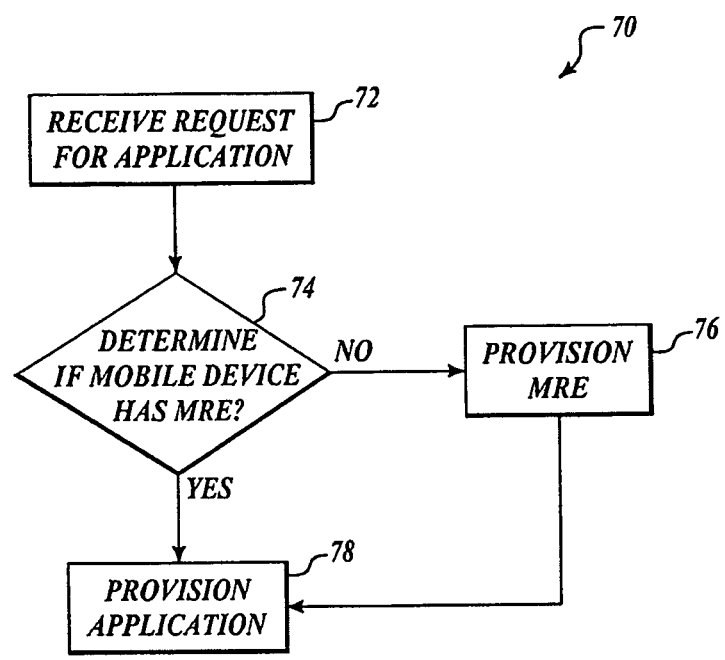
FIG. 2 illustrates a flowchart for provisioning a software application in accordance with an embodiment of the present invention.

FIG. 2 shows a flowchart 70 illustrating an example method for provisioning a mobile software application. At a first block 72, a request for a software application is received at an application server from a mobile device. Next, at a block 74, it is determined by an application server if the mobile device requesting the software application already has a moblet runtime environment (MRE) present on the mobile device. This step is performed using information or an indication contained in the request of the first block 72. This could also be determined by the absence of an indicator showing the mobile device has an MRE installed. If the mobile device does have an MRE present on the device, the method proceeds to a block 78, where the software application is provisioned to the device via a cellular wireless network. However, if it is determined in the block 74 that the mobile device does not have an MRE present on the device, the method proceeds first to a block 76 where an MRE is first provisioned to the mobile device before the application is provisioned at the block 78. If an MRE is provisioned to the device, this is done transparently such that the user of the mobile device will see the process as merely being a provisioning of the desired application.

Figure 3:
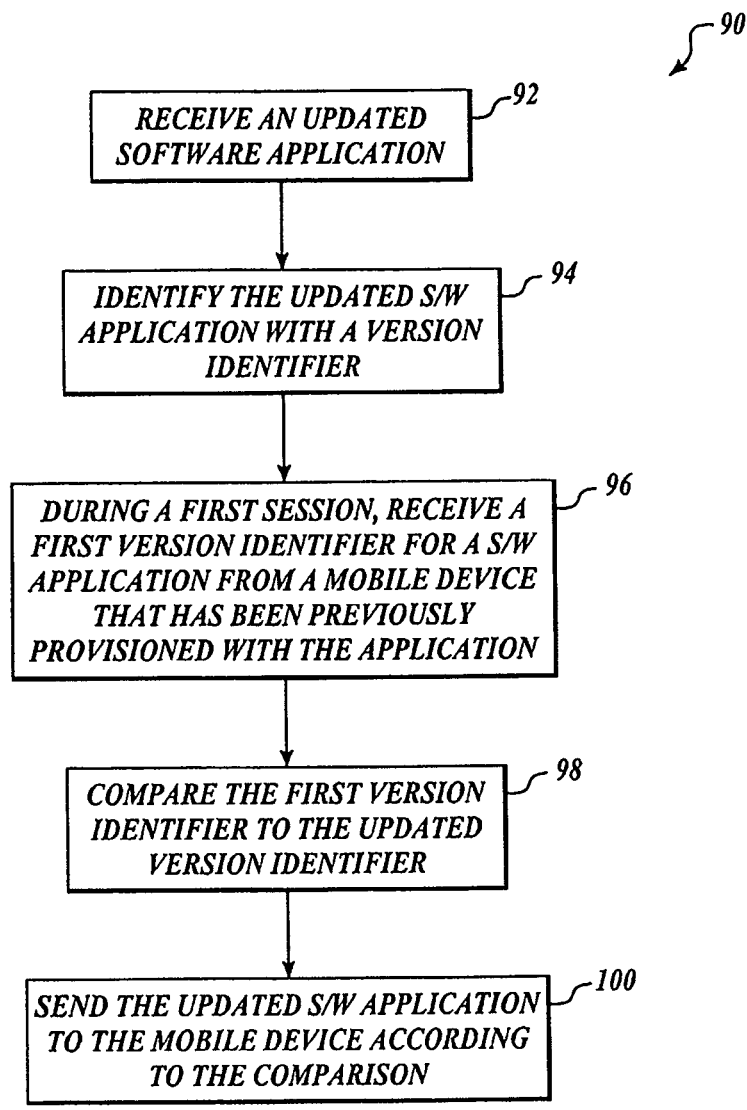
FIG. 3 illustrates a flowchart for updating a software application in accordance with the present invention.

FIG. 3 shows a flowchart 90 illustrating an example method for updating a mobile software application. The flowchart 90 includes five blocks. At a first block 92, an updated software application is received from a development environment at an application server. The first block 92 is followed by a second block 94 where the updated software application is identified with an updated version identifier. Although not shown in the flowchart 90, the second block 94 could also include an additional component where, via an administrator's console 26, a user with administrative privileges selects which version is appropriate for release. The second block 94 is followed by a third block 96 where, during a first session, a first version identifier is received by the application server for a software application from a mobile device that has been previously provisioned with the application. The third block 96 is followed by a fourth block 98 where the first version identifier is compared to the updated version identifier that was assigned as described in the second block 94. The fourth block 98 is followed by a fifth block 100 where the updated software application is sent to the mobile device according to the comparison performed in the fourth block 98. For example, the procedure would update the application if it was determined that the mobile device did not have the most current version of the software that had been identified as being updated in the server and, in alternative cases, further identified as being proper for release. As an additional example, the procedure could also update the application if the version on the mobile device is not the same as a version identified as being proper for distribution. This could be the case if a release needed to be rolled back to an earlier version for some reason or if it was desired to distribute an entirely different application in place of the one currently on the mobile device.

Figure 4:
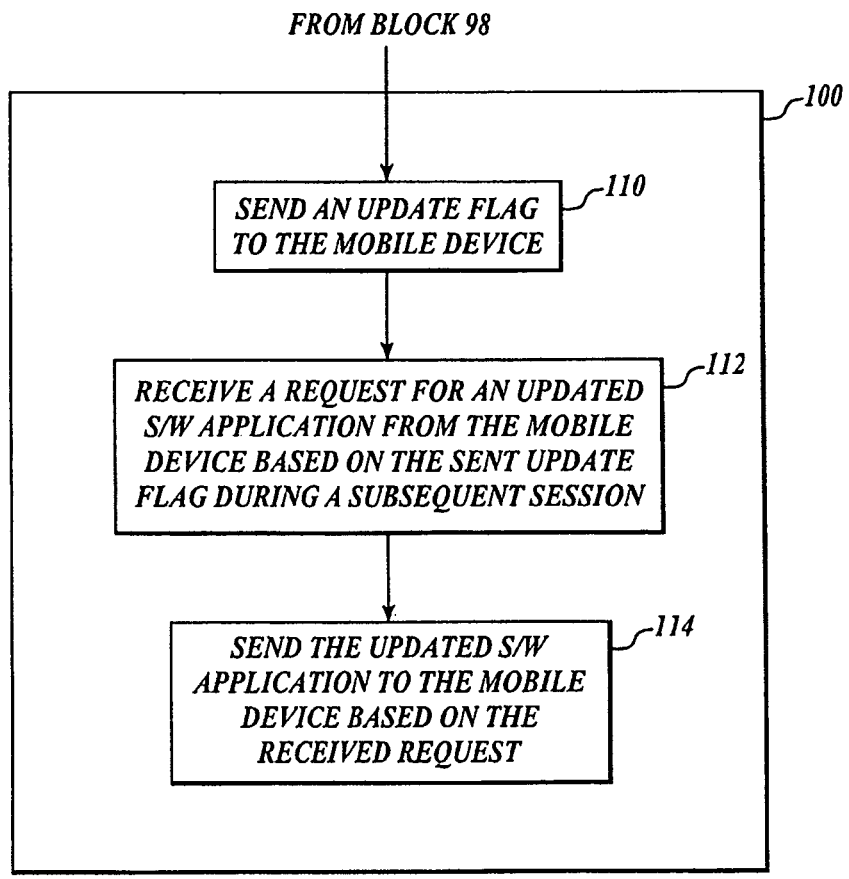
FIG. 4 illustrates a flowchart showing more detail for the step of sending an updated software application to a mobile device in accordance with an embodiment of the present invention.

FIG. 4 illustrates additional detail for the fifth block 100 shown in FIG. 3. The fifth block 100 is shown to include three subparts in the embodiment shown in FIG. 4. At a block 110, an update flag is sent to the mobile device. The block 110 is followed by a block 112 where a request for an updated software application is received from a mobile device based on the updated flag that had been sent in the block 110. This request is sent by the MRE residing on the mobile device without need for the user of the mobile device to specifically request or approve the provisioning of an updated application. Thus, the application will appear to be upgraded automatically to the user of the mobile device. This request reception occurs during a subsequent session between the mobile device and the application server. The block 112 is followed by a block 114 where the updated software application is sent to the mobile device based on the request received in the block 112.

FIGS. 5A-D illustrate front views of the mobile device 30 in accordance with an embodiment of the present invention. The first mobile device 30 is shown as having a mobile device screen 120 which is displaying a first user interface display 122. The first user interface display 122 is driven by a particular mobile software application present on the first mobile device 30. In this example, a banner area 124 is shown on the first user interface display 122. The banner area 124 in this example displays the name Hotspot which identifies the application currently in use. The first user interface display 122 also includes a first row 126, a second row 128, and a third row 130. These three rows display various options available using the current application. The first row 126 is displaying a find by zip selection which is highlighted as being selected by a user of the first mobile device 30. A feedback option is located in the second row 128 and an about option in the third row 130 which are displayed, but not highlighted, on the first user interface display 122. The first user interface display 122 also shows selections available at a lower left corner 132 of the mobile device screen 120 and a lower right corner 134 of the mobile device screen 120. In this example, the lower left corner 132 displays a select indicator. In this embodiment, the lower left corner 132 is controlled by a first select button 136 which is also shown as S1 on the keypad of the first mobile device 30. In alternative embodiments, it might also be possible to indicate a selection of the lower left corner 132 or the lower right corner 134 by other means, such as by using a touch pad or possibly a directional indicator with a select button. As with the lower left corner 132, in this example, the lower right corner 134 is controlled by a second select button 138 which is also indicated as S2 on the keypad of the mobile device 30. A four-way directional d-pad 140 is also shown on the keypad of the mobile device 30. In this example, the four-way directional d-pad 140 is used to scroll between the rows available for selection shown in the first user interface display 122. In the center of the four-way directional d-pad 140, a selector 142 is shown in the figure. The selector 142 could be an independent button or it could also simply be an area of the four-way directional d-pad 140 which, when pressed, indicates a selection of a highlighted item.

After one of the rows has been highlighted for selection, the selector 142 is pressed or the first select button 136 is activated. In this example, the first row 126 showing "Find by Zip" has been highlighted, then when the selector 142 is pressed, a second user interface display 144 as shown in FIG. 5B will appear. In this example, the banner area 124 remains the same so the user of the first mobile device 30 will see they are still within the same software application. However, as can be seen in FIG. 5B, the second user interface display 144 has changed the content of the first three rows of the display screen. In this case, the first row 126 illustrates "Enter Zipcode" informative statement and the second row 128 shows a box where a zipcode may be entered into the application. These are followed by the third row 130 showing a search option. It can be seen that the lower left corner 132 and the lower right corner 134 of the second user interface display 144 are also now different than those shown for the first user interface display 122. In this example, if a zip code had been entered in the second row 128 and the search selection shown in the third row 130 had been chosen, a third user interface display 146 would appear as shown in FIG. 5C. This is covered with a first overlay 148 while the application is conducting a network call to receive the information related to the zipcode entered in the third user interface display 144. The application would send the entered zipcode to the server farm 22 via the cellular wireless network 28. This information would be forwarded by the server farm 22 to the location of the requested information, which could be held by the content provider 52, the database 54, or the web services provider 56. This information would be forwarded via the network 50. The desired information would then be passed back from the content provider 52, the database 54, or the web services provider 56 to the user of the mobile device 30 via the network 50, the server farm 22, and the cellular wireless network 28. The first overlay 148 will disappear from the screen and a fourth user interface display 150 will appear as shown in FIG. 5D once the results are available from the search.

Figure 5A:
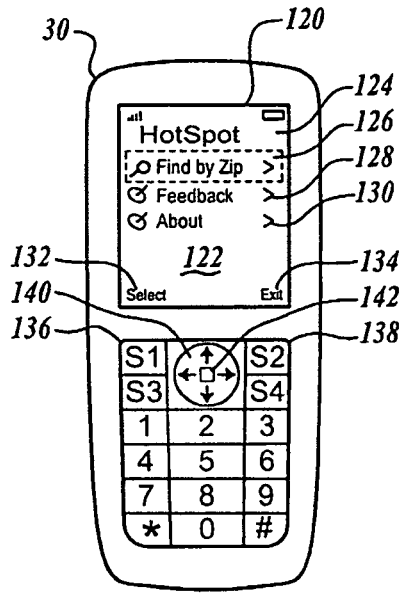
FIGS. 5A-D illustrate front views of a mobile device in accordance with an embodiment of the present invention.
Figure 5B:
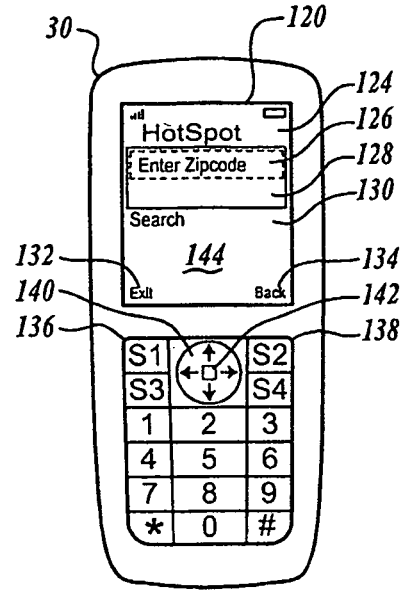
Figure 5C:
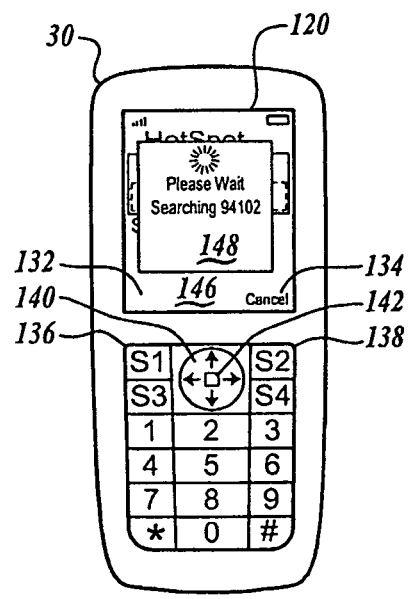
Figure 5D:
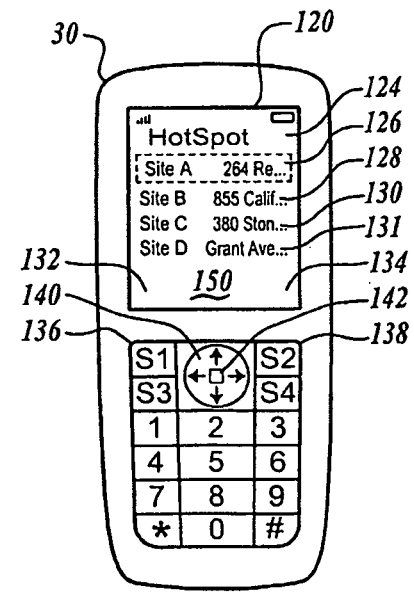
Figure 6A:
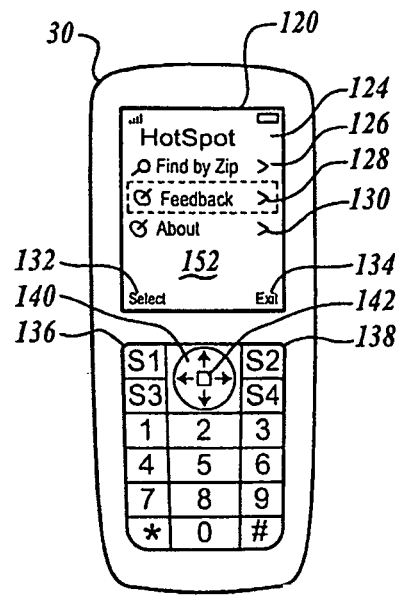
FIG. 6A-C illustrate front views of a mobile device in accordance with an additional embodiment of the present invention.
Figure 6B:
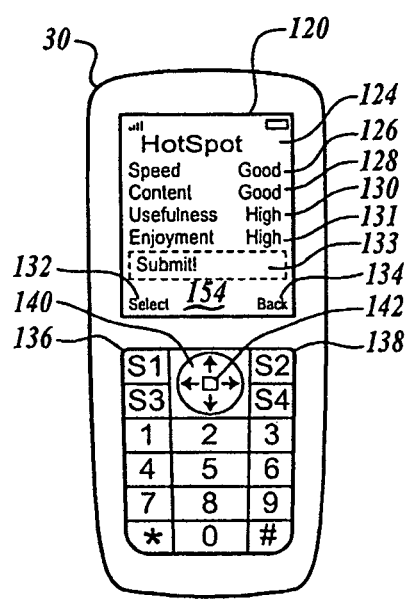
Figure 6C:
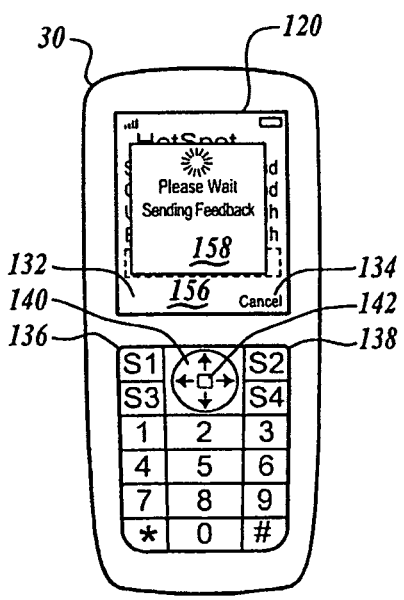

FIG. 6A is very similar to FIG. 5A. However, in FIG. 6A, the feedback option shown in the second row 128 has been selected rather than the find by zip selection shown in the first row 126. This is shown on a fifth user interface display 152. If the feedback selection is selected either by pressing the first select button 136 or by pressing the selector 142 after the second row 128 has been highlighted, a sixth user interface display 154 as shown in FIG. 6B will appear. In this figure, a fourth row 131 and a fifth row 133 are present. The sixth user interface display 154 shows a variety of options for selecting feedback of the user's experience using the HotSpot application and sending the feedback to the server farm 22 via the cellular wireless network 28. This information would be forwarded by the server farm 22 to the location desired by the creator of the application, which could be the content provider 52, the database 54, or the web services provider 56. This information would be forwarded via the network 50. Alternatively, the feedback information could be held by the server farm 22 without forwarding. In this example, after the various feedback categories have been selected for example by a predefined selection menu in the first four rows, a submit selection in the fifth row is chosen and a second overlay 158 as shown in FIG. 6C appears while the feedback is sent to the proper recipient. FIG. 6C also illustrates that the second overlay 158 is shown over a seventh user interface display 156.

Figure 7A:
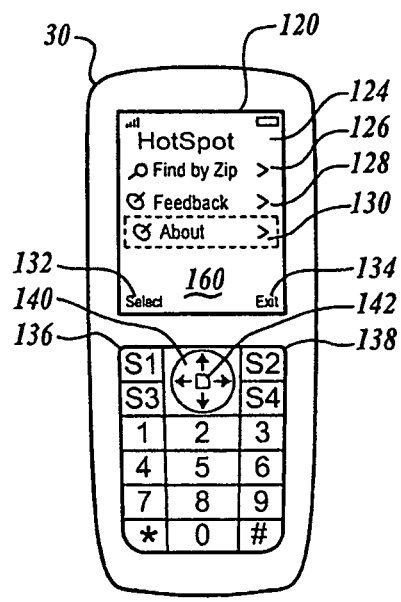
FIGS. 7A and B illustrate additional front views of a mobile device.
Figure 7B:
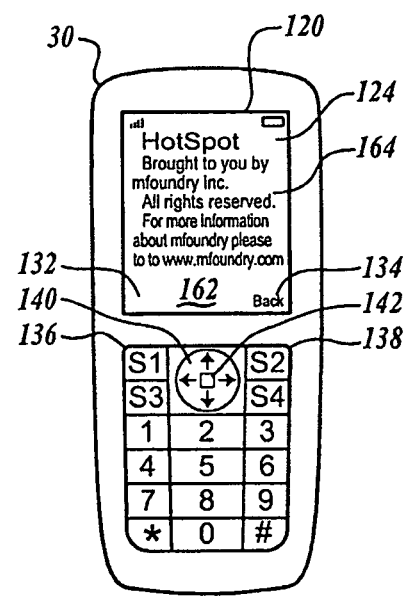

FIG. 7A is similar to both FIGS. 5A and 6A, but in this case, the about selection is highlighted rather than the find by zip or feedback selection. If the first select button 136 or the selector 142 is pressed after the third row 130 has been highlighted as shown in FIG. 7A, a ninth user interface display 162 as shown in FIG. 7B appears. As shown in FIG. 7B, the ninth user interface display 162 includes a text area 164 rather than the five rows, at least some of which, have been shown in each of the previous user interface displays. This text area 164 allows more text to be displayed than if the same rows had been used as before.

Figure 8:
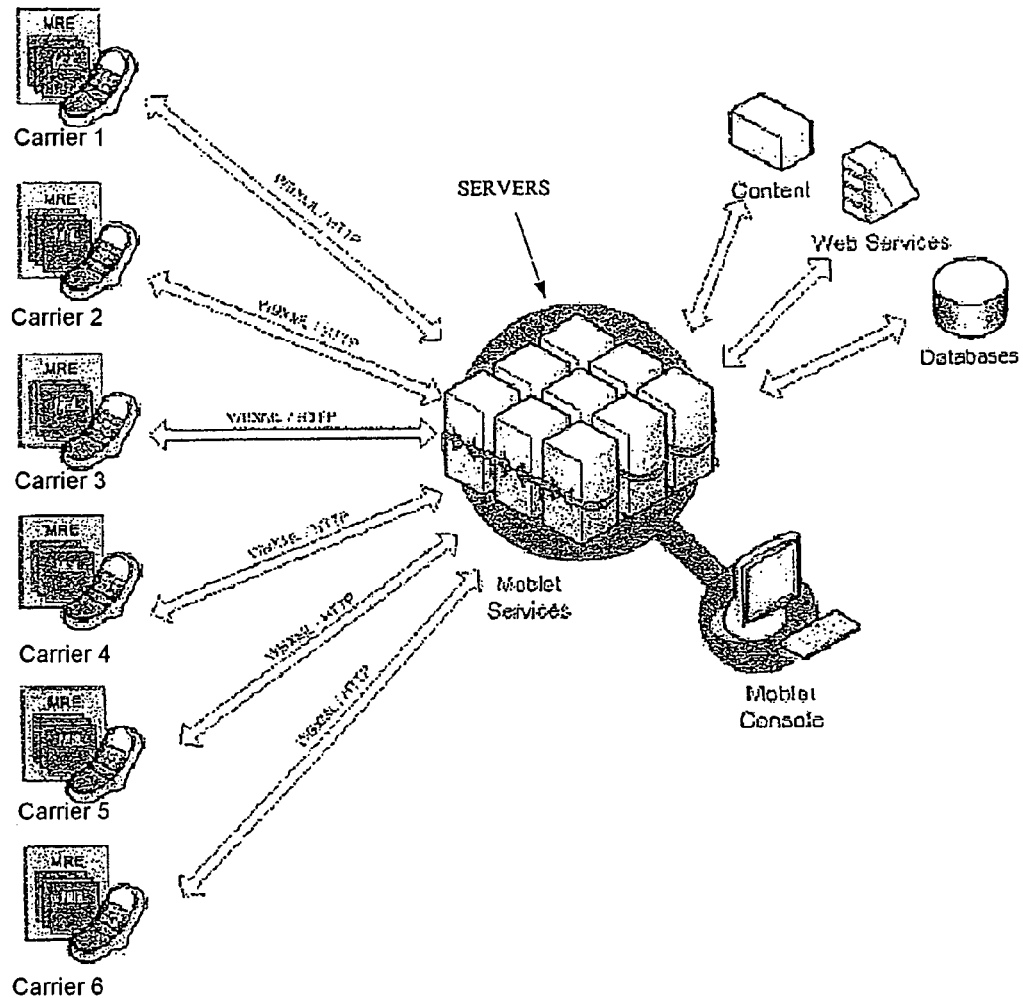

The following illustrates an example of an implementation of the system described above. FIG. 8 illustrates an example systems diagram formed in accordance with an embodiment with the present invention. A Moblet is a small mobile application are authored in Moblet Instruction Language (MIL), a highly optimized XML based language, then compiled and deployed over a server to devices running a Moblet Runtime Environment (MRE). Moblets running over the fully-hosted platform are fully data and network enabled; and can seamlessly integrate with existing legacy systems via standards-based Web Services.

All Moblets downloaded by a user are specially "tagged" with a unique user ID (UID). A user need never explicitly authenticate themselves via user name and password to access personalized services—the server already knows who the Moblet belongs to and authenticates on their behalf. For additional security, Moblets can be "locked" on the device side to prevent unauthorized usage of the Moblet from their device. Because access from the Moblet to $3^{rd}$ party web services is always done via the server, enterprise services are protected from nonauthorized access by unknown clients.

Moblet Instruction Language (MIL)

Moblets are authored using MIL. MIL is an XML based language that is designed for the express purpose of allowing a developer to quickly author a single version of an application that will run on any device that has previously received the MRE. Moblets, unlike native applications, can be developed without the many compatibility issues that exist with traditional mobile application development in languages such as J2ME or BREW.

In comparison, Moblet development provides the following advantages over traditional mobile application development:

Easy to Author—No Java or C++ development experience is required.

Easy to Deploy—Developers do not have to perform any device specific testing or certification prior to deployment.

Device Agnostic—Applications authored in MIL will run consistently across all supported devices.

Carrier Agnostic—No carrier specific considerations need be made by the application developer. MIL applications run consistently across all supported carriers.

Pervasive—MIL authored applications will run on almost all J2ME devices2.

Intuitive—MIL authored applications adhere to an established UI model that is consistent with existing user behavior.

Skinnable—Although the UI model is already established, Skins can be specified via MIL to provide a visually unique user experience.

Manageable—Applications authored in MIL can be upgraded or modified simply without the need for the end-user to reinstall the MRE. From an end-user's perspective, their applications will appear to have "automatically" upgraded themselves.

Responsive—MIL authored applications have no perceived latency or moment when a user is not in full control of the application.

Future-Proof—An application authored for the MRE is composed of a collection of MIL documents that are downloaded, cached, and interpreted by any MRE running on a device. MIL is a truly portable format that will run on any device that supports an MRE. No additional steps need to be taken to ensure that an application authored in MIL will run on multiple devices. In fact, as new devices are added to the MRE supported list, application deployed previously will also work on the newly supported devices.

Moblet Runtime Environment (MRE)

Running on the device, the MRE is a very lightweight application framework designed to run on virtually any data-capable mobile device. Weighing in at under 75 Kb, the MRE is easily downloaded to the mobile device Over-the-Air (OTA) within seconds, and to the end-user, the MRE appears to simply be the requested application, not a runtime environment. Essentially the MRE is a translation application that translates between device specific instructions and MIL. Thus, the MRE varies depending upon which mobile device it is to be used for.

Moblet Console

Every aspect of the Moblet lifecycle can be managed via an easy to use browser-based console. Empowered with a console of the server, an administrator can quickly and easily:

Publish and deploy Moblets

Release new features to existing Moblets

Manage content and external web services

Generate and download Moblet usage reports

Orchestrate integrated SMS, MMS, and WAP Push campaigns

Moblet Services

Activation and enablement of a Moblet is done via a collection of services hosted and managed at the server. Collectively referred to as Moblet Services, these services provide the following critical functions:

Website initiated Moblet provisioning

SMS Short Code initiated Moblet provisioning

Content management

External data and web services Integration

Carrier network SMS, MMS, and WAP Push integration

Anatomy of a Moblet

A Moblet is essentially MIL that is downloaded and interpreted by a device running the Moblet Runtime Environment or MRE.

Skins

Within MIL, a developer can specify image resources needed to skin the Moblet as well as many other visual attributes that allow for the creation of a visually unique and brand consistent Moblet. Although the user interface model and supported graphical components are fixed, virtually all aspects of these components and model are configurable.

Screen Templates

Moblets also derive screen layouts from templates declared within MIL. Much like other template languages, screen templates in MIL utilize a flexible data-binding framework that allows the developer to bind dynamic data to visual elements on the screen using a standards-based XPath expression language.

Data-Binding

Moblets fully employ a "Model-View-Controller" pattern to separate the presentation (screen templates) from the underlying data model. Models are declared either explicitly within MIL or dynamically interpreted from network resources accessed via the Moblet Services. XPath databinding expressions provide the controller logic that ties the models to the views.

Network Services

Moblets have full access to any Internet accessible XML service via the Moblet Services. Currently supported protocols include SOAP, XML-RPC, as well as any Well-Formed XML accessible via HTTP.

Life Cycle

Figure 9:
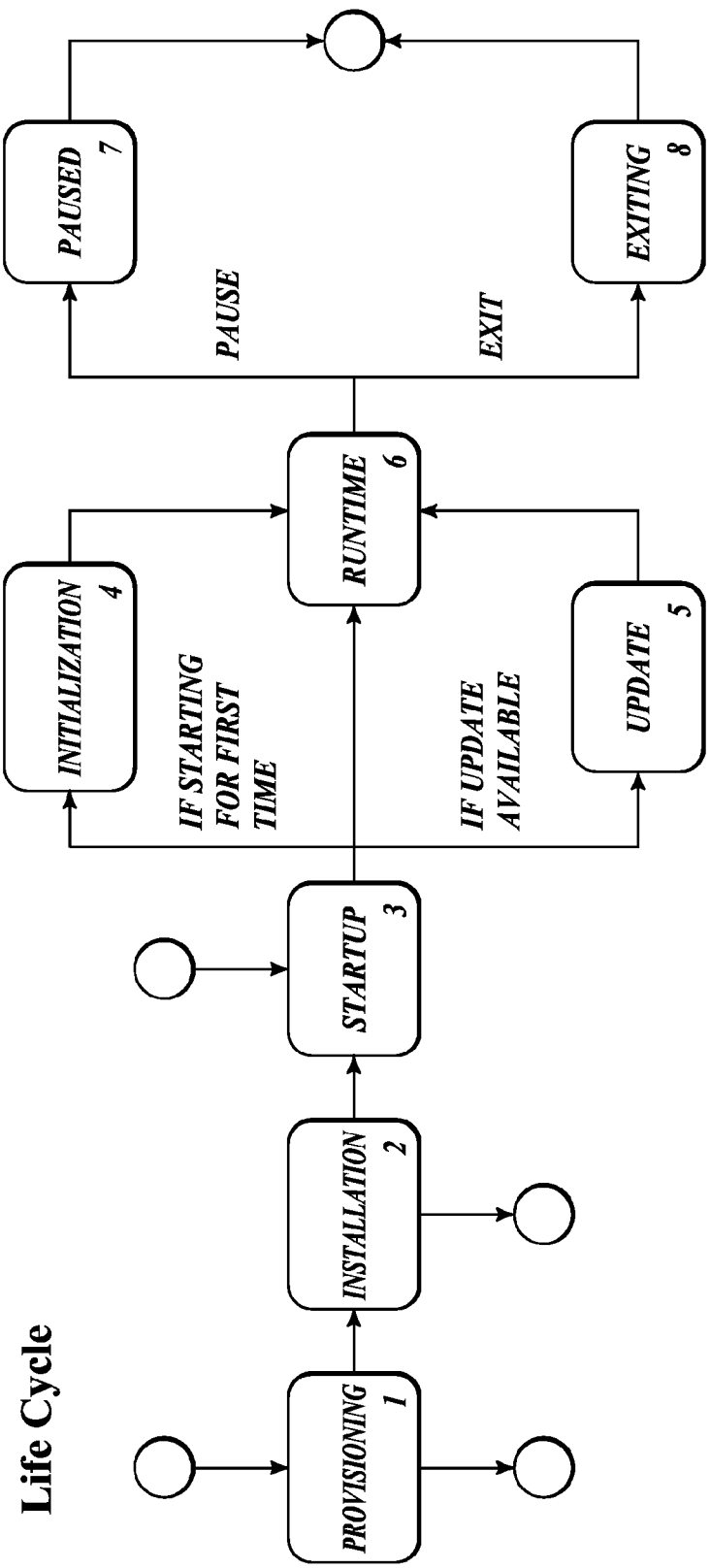

The lifecycle of a Moblet (FIG. 9) begins when the MRE (posing as the complete application) is initially provisioned and downloaded to the device (1). Once the MRE is successfully downloaded to the device an installation process begins (2). Upon completion of the installation, the user is given the option to immediately start using the Moblet. Once the MRE is installed onto a device it can be started (3). The first time the MRE is started it downloads and executes the MIL necessary to run the Moblet (4). If the Moblet was already initialized in a previous session, the MRE checks the Moblet Services for any MIL updates. If updates are found and downloaded, the MRE updates the Moblet with the new MIL (5). Once either initialized or updated, the MRE enters its runtime state (6) during which time the MIL is used to render screens, evaluate data-binding expressions, and make network calls to invoke external web services or download content in response to user interactions. A Moblet can be paused (7) if the application is interrupted by a phone call or incoming text message.

Should this occur, the state of the Moblet session is persisted until the Moblet is resumed. If the user explicitly exits the Moblet (8), session data is flushed.

Figure 10:
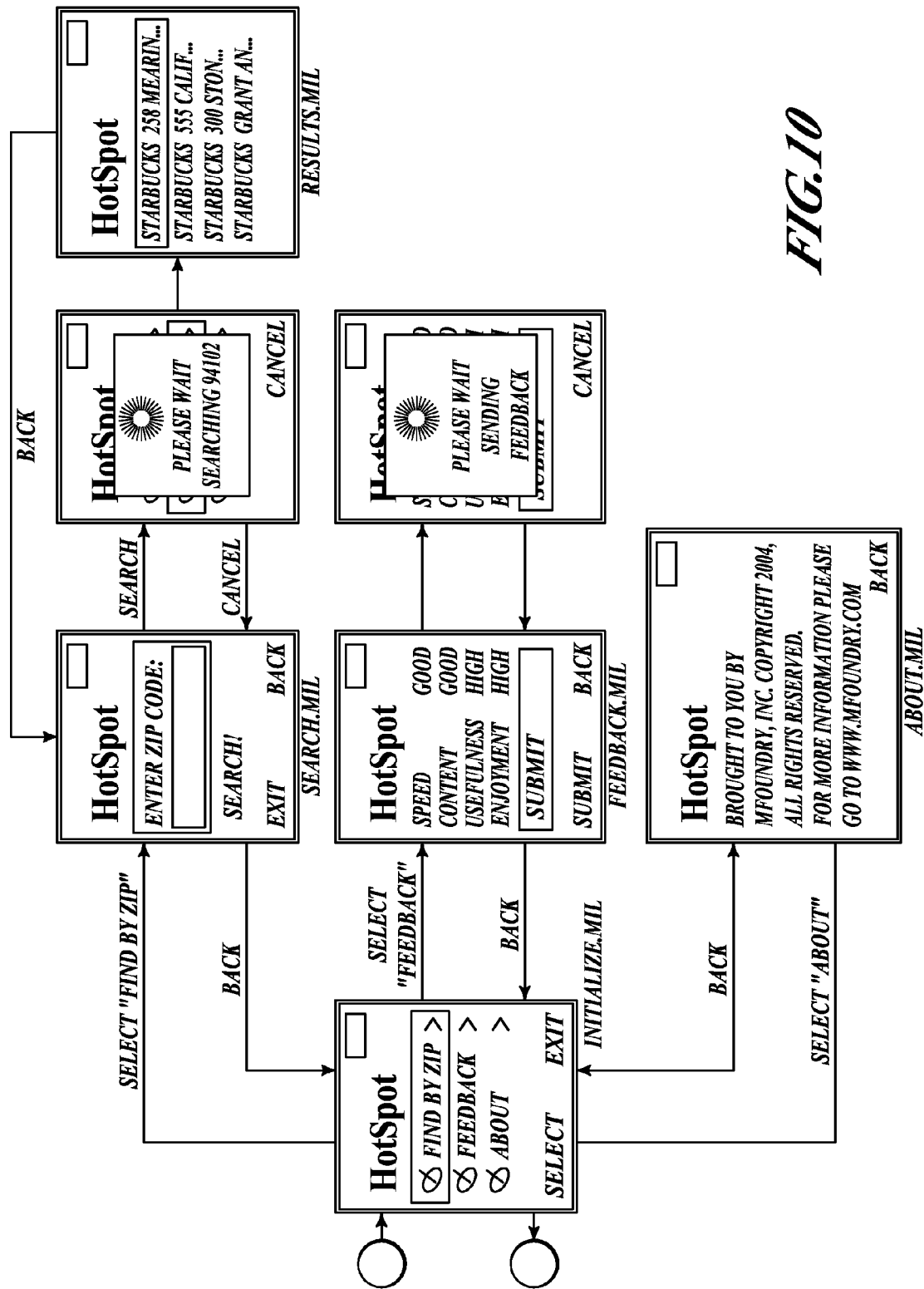

FIG. 10 illustrates and example Moblet called The Hotspot Moblet. Functionally, HotSpot is designed to give a user real-time access to an online directory of over 4,000 wireless access HotSpots. The Moblet also provides a survey that the user can fill out and submit back to server.

The following demonstrates an embodiment of a user interface implemented on and computing device for creating an application that retrieves headlines from a set of web news services.

Creating a New Project

A development platform called Eclipse is used for writing applications. Eclipse supports editing in a variety of environments. Mworks provides a dedicated "perspective" within Eclipse that makes it easier to create Moblets. When an open bracket (<) is typed, Eclipse displays the set of tags available at that point in the created program. Within a tag, when the spacebar is depressed, Eclipse displays the attributes available for that tag.

Figure 11:
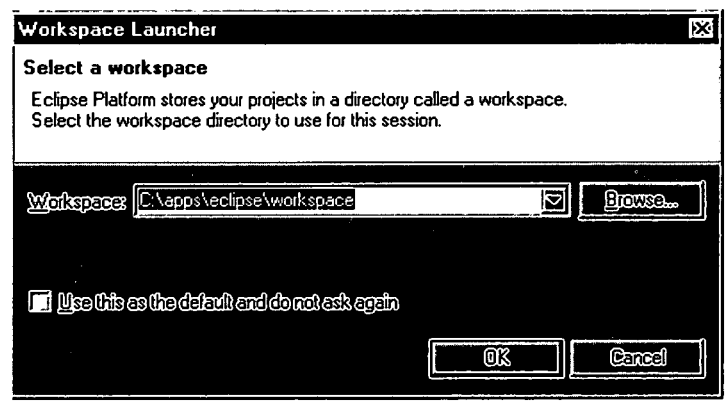
Figure 12:
Figure 13:
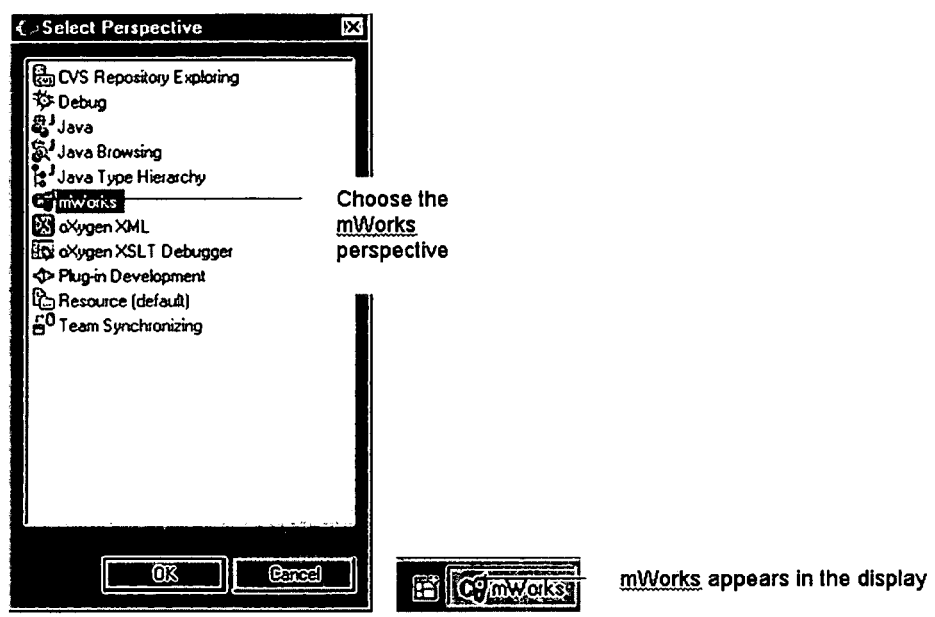
Figure 14:
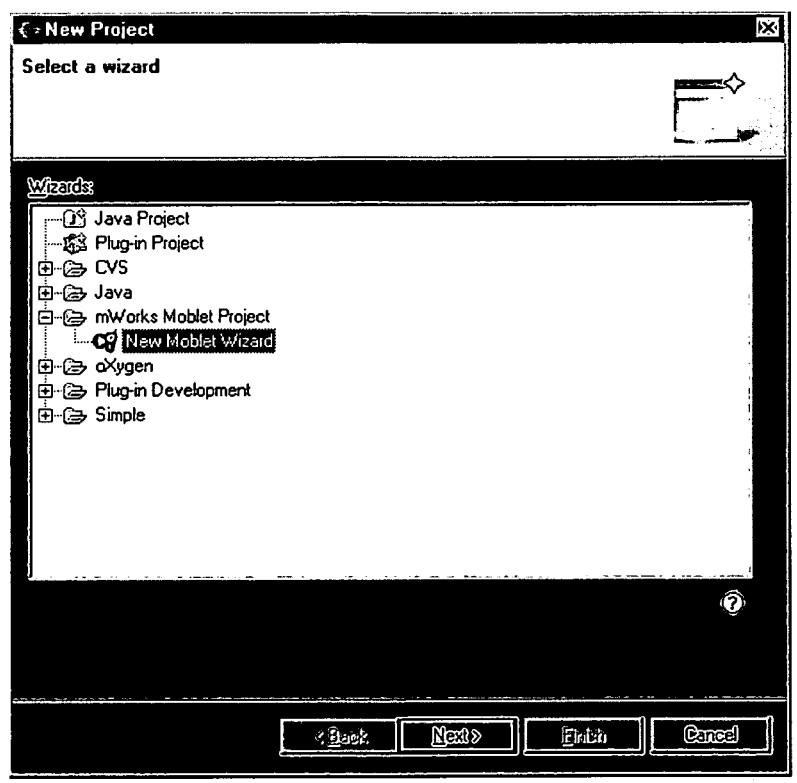
Figure 15:
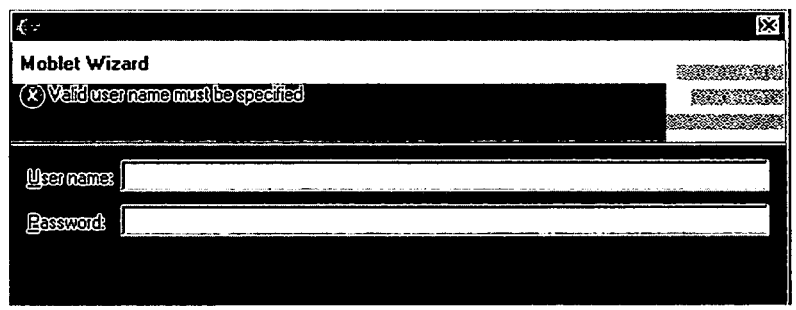
Figure 16:
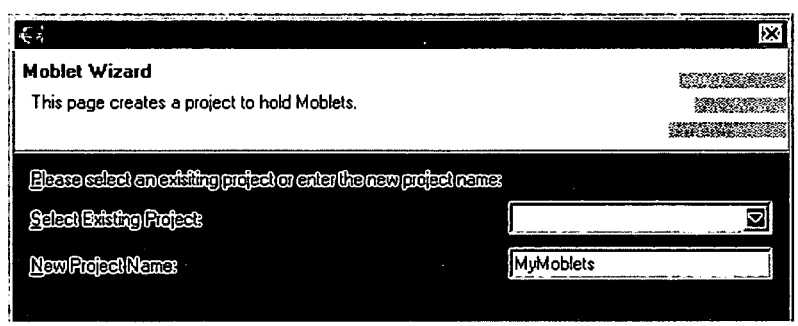
Figure 17:
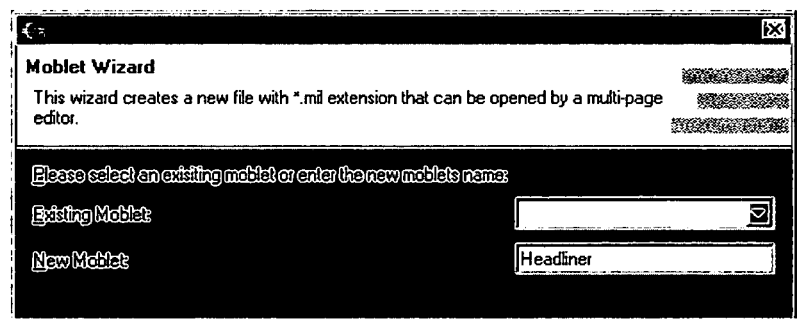
Figure 18:
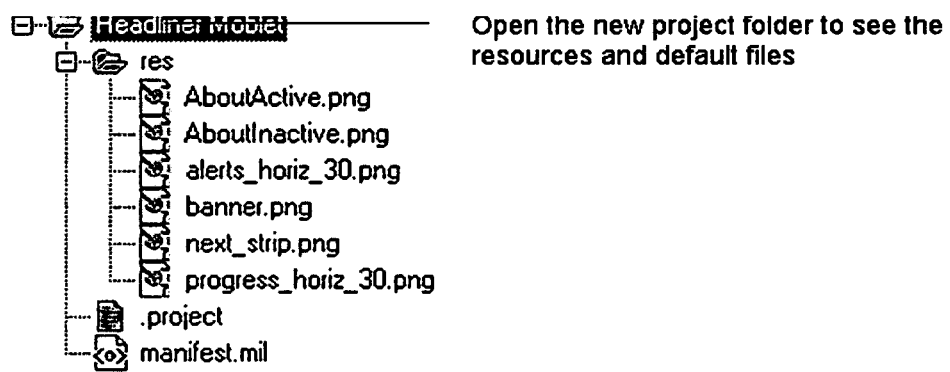

To create a new Moblet project in Eclipse:
1. Open Eclipse from the Start menu or a desktop icon.
2. Choose the default workspace.
   See FIG. 11.
   To save time in the future, check the box to use this workspace as the default in the future.
3. In the upper right-hand corner of the Eclipse window, click the box with the plus sign and choose Other.
   See FIG. 12. Click here to select a perspective
4. From the displayed list, choose Mworks Perspective.
   See FIG. 13.
5. Right-click anywhere in the left-hand panel and choose New>Project.
6. In the New Project window, choose Mworks Moblet Project >
New ProjectWizard and click Next.
Choose the mWorks perspective See FIG. 14.
7. Type the user name and password that were previously provided and click Next.
   See FIG. 15.
8. In the New Project Name field, type a name for this project and click Next.
   See FIG. 16.
   Multiple Moblets can be created within a project. Once a project has been created, choose it from the Select Existing Project list instead of creating a new one.
9. In the New Moblet field, type a name for this Moblet and click Finish.
   See FIG. 17.
   If an existing Moblet is chosen, its existing tags can be used as the basis for a new one and use Save As to save it with a new name.
   Eclipse creates a new Moblet project, with a set of default images and a manifest file.
   See FIG. 18.
   A list of tags are presented in the main panel. Many tags are provided for illustration purposes only. Delete everything within the <mil> and </mil> tags. The result should look something like this:
   See FIG. 19.

Calling a Web Service

Most mobile applications make use of a web service of some kind. For example, the sample Headliner application calls a set of news services and retrieves their current headlines. In order to properly contact a web service, you must do three things:
Define the service at the top of the project, specifying an id, hostname, path (to the page containing the data), and resultid (a name for the XPATH definition of the data to display).
Refer to the id for the service when you call the screen that uses that service.
Refer to the resultid for the service when you define the screen that displays the results.
Start by defining the service. The other two steps are done in the screen definitions that require them.

Figure 21:
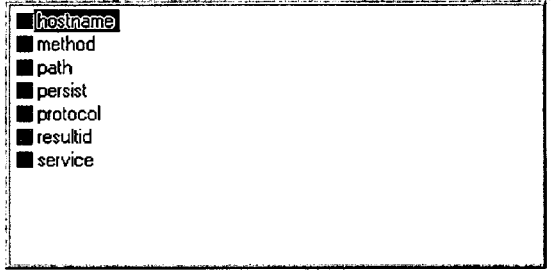

To define a web service:
1. Place the cursor on a blank line after the <mil> tag. Type an open bracket (<) to see a list of possible tags.
   See FIG. 20.
   Choose httpservice. The httpservice tag is inserted, and the cursor is automatically placed between the quotation marks so the user can specify an ID for this service.
2. Type the ID name for this service. In this example, the service is called "GetEngadgetNews."
3. Place the cursor just before the close bracket (>) in this tag and press the spacebar to see the attribute choices for the httpservice tag. Choose hostname.
   See FIG. 21.
4. Between the quotation marks, type the hostname for this service. In this example, the hostname is www.engadget.com.
5. Place the cursor just before the close bracket (>) in this tag and press the spacebar again. Choose path.
   Notice that hostname is no longer listed as an option. Since only one hostname attribute for an httpservice tag is allowed, that attribute is removed from the list once it is defined.
6. Between the quotation marks, type the path to the page containing the data desired. In this example, the path is /rss.xml.
7. Place the cursor just before the close bracket (>) in this tag and press the spacebar again. Choose resultid.
8. Between the quotation marks, type a name for the XPATH definition of the data to display. In this example, the resultid is news.
   When finished, the httpservice tag should look something like this:
   See FIG. 22.

Creating the Home Screen

Every application has a home screen, which displays when the user starts the application. Usually, this screen is a menu of some kind, allowing the user to choose between the application's features. In the case of the Headliner application, the home screen is a list of news sources whose headlines the user can display.

Note: By default, the home screen is called "home." If the user wants to call it something else, the user must change the index attribute of the mil tag so that the home screen name matches the index attribute.

To create the home screen:
1. Place the cursor on a blank line after the </httpservice> tag. Type an open bracket (<) to see a list of possible tags.

See FIG. 23.

Choose screen.

Note: As a shortcut, type s while the list is displayed to see only tags beginning with s. Then type a c, only the screen tag appears and activating Enter will select it.

See FIG. 24.

2. Type home between the quotation marks.
3. Move the cursor just before the </screen> tag and press Enter twice to create a blank line.

Figure 25:
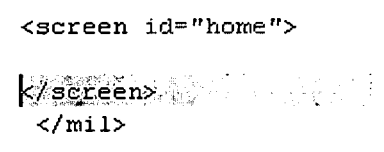

See FIG. 25.

4. On the new blank line, type another open bracket and choose List from the list of tags.

See FIG. 26.

The list of menu items is created for the application. Each item will be defined by an option tag.

5. Move the cursor just before the </list> tag and press Enter twice to create a blank line.
6. On the new blank line, type another open bracket and choose Option from the list of tags.
7. Type the name of the first option between the quotation marks.

In this example, the first news option is called Engadget. Since this option ("Engadget") will call a web service in order to display its data, that service must be specified, along with the name of the target. The service is specified using the resultid attribute. When setting up a target, Mworks first checks for an alert, then a service, then the target screen. If the target screen requires a service to do its job, the service is called before you display the target screen.

8. Press space after the label definition and choose service. Type the ID defined for this service between the quotes. In this example, this is GetEngadgetNews.
9. Place the cursor just before the slash (/) in this tag and press the spacebar to see the remaining attribute choices for the option tag. Choose Target.

Figure 27:
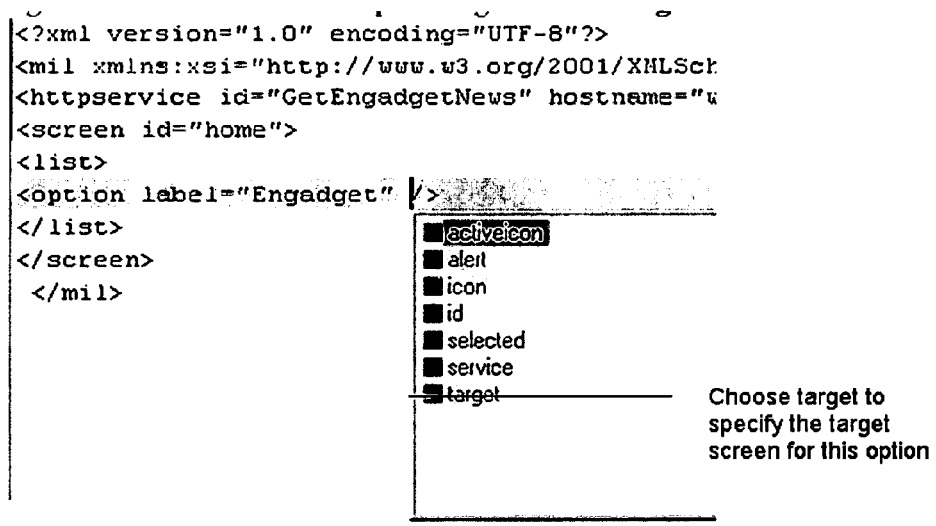

See FIG. 27.

The target tag specifies the name of the screen to display when the user selects the current item.

10. Between the quotation marks, type the name of the target screen for this menu item.

The target screen can be named whatever is desired. In this example, the Engadget option calls the EngadgetScreen target.

The first option tag should look like this:

See FIG. 28.

11. If desired, the remaining options for the home screen can be defined.

In this example, The Wall Street Journal and Ars Technica have been added.

Creating a Target Screen

Each of the options in the list will call a separate target screen. The name for each target screen must match the target attribute for that screen in its respective home screen option. For example, Engadget target is called "EngadgetScreen," that target screen is named "EngadgetScreen."

To create a target screen:

1. Place the cursor on a blank line after the </screen> tag. Type an open bracket (<) to see the list of possible tags and choose screen.
2. Type an open bracket and choose Form.

The form tag is used when you want to display data.

3. Position the cursor just before the </form> tag and press Enter twice to create a blank line.
4. On the blank line, type an open bracket and choose repeater.

The repeater tag iterates through a set of data to find multiple instances of the data that matches criteria to be specify. In this example, it will search through the /rss.xml page to find multiple headlines.

The project should look something like this:

See FIG. 29.

5. Move the cursor just before the closing bracket of the <repeater> tag and press the spacebar to see the available attributes. Choose source.

Defining an XPATH Command

The cursor is now between the quotation marks defining the source attribute. But before the user can specify the XPATH command to retrieve the data from the /rss.xml page, the user will need to examine that page and determine the correct command.

In the web browser, type the URL defined as the hostname. In this example, this is www.engadget.com. Append the pathname of the page (in this example, /rss.xml) and display that page. This example page looks like this:

See FIG. 30.

The desired headlines are nested, using the following tags: rss/channel/item/title.

Using this information, the XPATH command is created.

To define the XPATH command for your source:

1. Within the quotation marks for the source attribute, type an opening curly brace ({) followed by the name of the resultid you defined in the httpservice tag at the top of the project.
2. Without adding any spaces, type a pound sign (#), followed by the set of nested tags that lead to the item the user wants.

In this example, the command looks like this:

{news#rss/channel/item/title}

The source attribute just defined retrieves the information, and placing it in a repeater tag iterates through all of the headlines. Now the user needs to add a command that will display the resulting information.

Displaying Your Results

1. Place the cursor after the closing bracket of the <repeater> tag and press Enter to create a blank line.
2. On the new blank line, type an opening bracket and choose textitem.
3. Press the spacebar and choose label.
4. Between the quotation marks, specify that the label for this text item is a variable called "text" by typing the following:

{text( )}

The project should now look something like this:

See FIG. 31.

Previewing your Work

MWorks provides an emulator that lets the user see exactly how a user would see your application on a real mobile device. The emulator looks like a cellphone.

To preview your work:

1. Save the project by clicking the Save icon.

Figure 32:

See FIG. 32.

2. In the left-hand panel, select the name of the project.
3. Right-click and choose mWorks>Preview.

Figure 33:
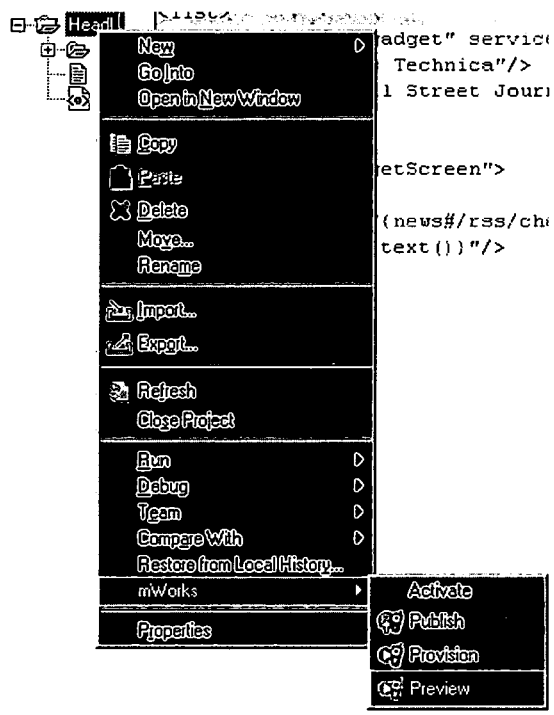

See FIG. 33.

A console panel appears on the right, showing the progress of the interpretation of the. commands.

Figure 34:
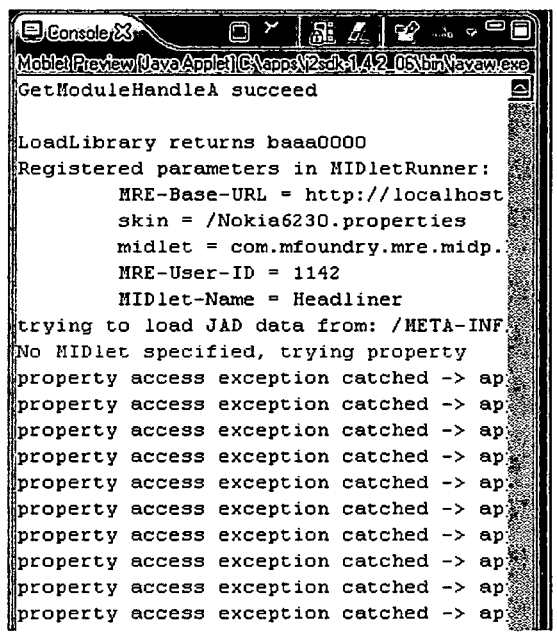

See FIG. 34.

Then a window appears, showing how the Moblet looks on a phone.

See FIGS. 35A and 35B.

Creating the Remaining Target Screens

If desired, the user can define the remaining target screens. The basic steps are listed below.

To define the target screens:
1. For each target, define an httpservice tag at the top of the project Gust below the one that's already there).
   Each httpservice tag requires the following attributes: ID, hostname, path, and resultid.
2. Define a form tag to contain the data retrieved.
3. Within the form tag, use a repeater tag to iterate every matching item in the retrieved data set.
4. Within every repeater tag, use the source attribute to define an XPATH command that specifies how to drill down to the desired data set, using the syntax {resultid# /tag/tag/tag}.
5. Within every repeater tag, use a textitem tag to display the text. Define the label attribute as {text ( )} to make it a variable that displays all iterations of the matching items retrieved.

See FIGS. 36A and 36B.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method comprising:
receiving at an application server an updated software application for a first software application from a development environment, wherein said updated software application and said first software application are generic to a plurality of mobile device types;
identifying the updated software application with an updated version identifier;
transmitting a software application interpreter to a mobile device if said mobile device does not comprise said software application interpreter installed therein, wherein said software application interpreter is mobile device type specific and is operable to interpret said updated software application;
receiving a first version identifier associated with said first software application residing on said mobile device;
comparing the first version identifier to the updated version identifier;
transmitting an update flag to the mobile device responsive to a mismatch between said first version identifier and said updated version identifier;
receiving a request for the updated software application from the mobile device based on the update flag;
associating a unique user ID with the updated software application, wherein the unique user ID is configured to provide the updated software application access to third party web services via the application server; and,
transmitting the updated software application and the unique user ID associated with the first software application to the mobile device based on the received request.

2. The method of claim 1, wherein said first software application is configured to present a user interface at the mobile device, wherein the user interface comprises:
a first display screen operable to display a plurality of group names; and
responsive to a selection of a group name from said plurality of group names, a second display screen operable to display one or more item names, associated with said selection.

3. The method of claim 1, wherein said first software application is configured to receive content from a computer system coupled to the mobile device via the cellular network.

4. The method of claim 1, wherein the updated software application is configured to change a user interface associated with said first software application.

5. The method of claim 1, wherein said updated software application is associated with an extensible markup language (XML).

6. The method of claim 1, wherein said first software application is operable in a mobile environment including a Moblet Runtime Environment that is generic to a plurality of mobile device types.

7. A server device comprising:
one or more memory devices storing software instructions; and
one or more processors configured to execute the software instructions to:
receive an updated software application for a first software application from a development environment, wherein said updated software application and said first software application are generic to a plurality of mobile device types;
identify an updated version identifier associated with the updated software application;
transmit a software application interpreter to a mobile device if said mobile device does not comprise said software application interpreter installed therein, wherein said software application interpreter is mobile device type specific and is operable to interpret said updated software application and said first software application;
receive a first version identifier associated with said first software application residing on said mobile device;
compare the first version identifier to the updated version identifier; and
transmit an update flag to the mobile device responsive to a mismatch between said first version identifier and said updated version identifier; and
receive a request for the updated software application from the mobile device based on the update flag;
associate a unique user ID with the updated software application, wherein the unique user ID is configured to provide the updated software application access to third party web services via the server device; and,
transmit the updated software application and the unique user ID associated with the first software application to the mobile device based on the received request.

8. The server device of claim 7, wherein said first software application is configured to display a user interface comprising:
a first display screen operable to display a plurality of group names; and
responsive to a selection of a group name from said plurality of group names, a second display screen operable to display one or more item names associated with said selection.

9. The server device of claim 7, wherein said first software application is configured to receive content from a computer system coupled to the mobile device via the cellular network.

10. The server device of claim 7, wherein the updated software application is configured to change a user interface associated with said first software application.

11. The server device of claim 7, wherein a format of said updated software application is associated with an extensible markup language (XML).

12. The server device of claim 7, wherein said first software application is operable in a mobile environment including a Moblet Runtime Environment that is generic to a plurality of mobile device types.

13. A method comprising:
receiving, at an application server, a request for a software application from a mobile device, wherein the request includes an indicator, wherein said application server is operable to use said indicator to determine whether a software application interpreter is installed on the mobile device, wherein said software application interpreter is mobile device type specific and is operable to interpret the software application;
responsive to a determination that said software application interpreter is not installed on said mobile device, transmitting the software application interpreter to said mobile device; and
transmitting the software application to said mobile device, wherein said software application is generic to a plurality of mobile device types;
transmitting an update flag to the mobile device responsive to determining that an update to the software application transmitted to the mobile device is available;
receiving a request for the update from the mobile device based on the update flag;
associating a unique user ID with the update, wherein the unique user ID is configured to provide the updated software application access to third party web services via the application server; and
transmitting the update and the unique user ID associated with the software application to the mobile device based on the received request.

14. The method of claim 13, wherein said software application is operable in a mobile environment including a Moblet Runtime Environment software application interpreter that translates between instructions specific to a type of said mobile device and said software application.

15. The method of claim 14, wherein said Moblet Runtime Environment comprises a lightweight application framework software application interpreter that is specific to a type of said mobile device.

16. A server device comprising:
one or more memory devices storing software instructions; and
one or more processors configured to execute the software instructions to:
receive a request for a software application from a mobile device via a cellular wireless network;
determine, based on said request, whether an software application interpreter is installed on the mobile device, wherein said software application interpreter is mobile device type specific and is operable to interpret the software application;
transmit said software application interpreter to said mobile device for provisioning to the mobile device, responsive to a determination that said software application interpreter is not installed on said mobile device;
transmit said software application to said mobile device for provisioning to the mobile device, wherein said software application is generic to a plurality of mobile device types;
transmit an update flag to the mobile device responsive to determining that an update to the software application provisioned to the mobile device is available;
associate a unique user ID with the update, wherein the unique user ID is configured to provide the updated software application access to third party web services via the server device; and
receive a request for the update from the mobile device based on the update flag; and
transmit the update to the mobile device based on the received request.

17. The server device of claim 16, wherein said software application is operable in a mobile environment including a Moblet Runtime Environment software application interpreter that translates between instructions specific to a type of said mobile device and said software application.

18. The server device of claim 17, wherein said Moblet Runtime Environment comprises a lightweight application framework software application interpreter that is specific to a type of said mobile device.

* * * * *